Nov. 23, 1948.  J. G. LEE  2,454,324
CONTROL FOR ENGINE COOLING BLOWERS
Filed June 7, 1944
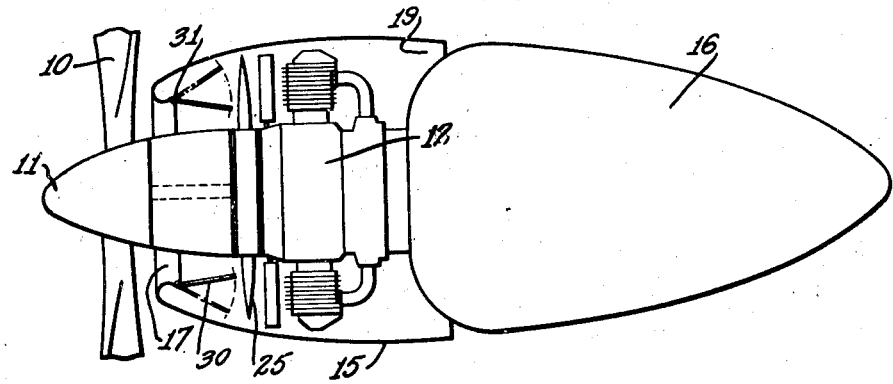
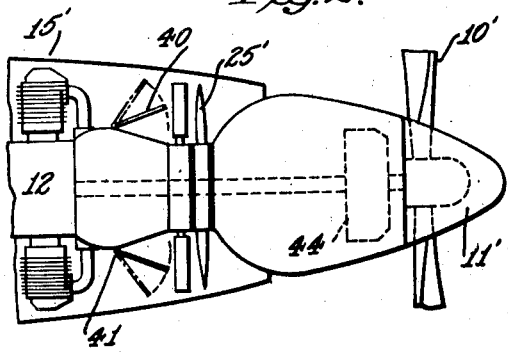 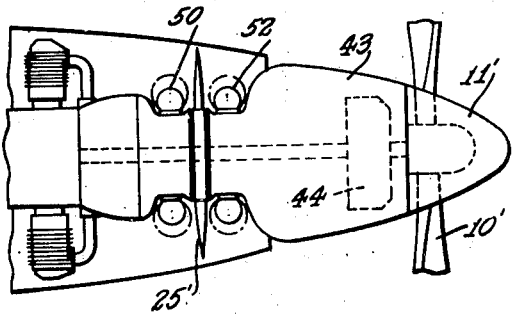
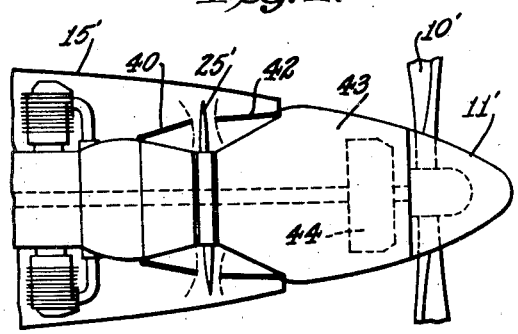 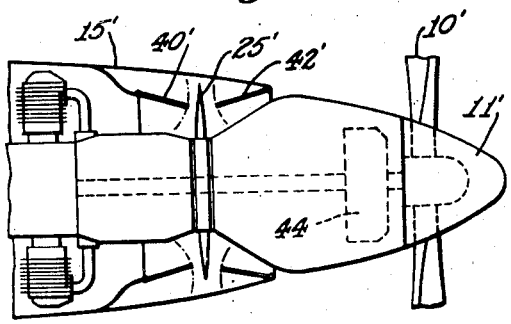
INVENTOR.
JOHN G. LEE
BY
John C. Kerr
ATTORNEY Patented Nov. 23, 1948

2,454,324

UNITED STATES PATENT OFFICE 2,454,324

CONTROL FOR ENGINE COOLING BLOWERS

John G. Lee, Farmington, Conn., assignor to United Aircraft Corporation, East Hartford, Conn., a corporation of Delaware Application June 7, 1944, Serial No. 539,218

3 Claims. (Cl. 230—114)

This invention relates to aircraft, and more particularly, to the engine cooling systems therefor. Aircraft engines are enclosed in a cowl which is open to the atmosphere at its ends so that the travel of the airplane will cause air to enter the cowl, pass over the engine to effect cooling thereof and discharge through the rear opening. In certain types of aircraft, the amount of cooling air thus provided is insufficient for most operating conditions unless a booster in the form of a blower is provided within the cowl to force more air therethrough. The fan may be positioned either at the front or rear of the engine. For different operating conditions, such as different altitudes, it is desired that the fan shall be effective to the desired degree for the particular operating condition. Therefore, it is one of the principal objects of this invention to provide controllable means for varying the effectiveness of the fan.

It is a further object of this invention to vary the effectiveness of the fan by varying the amount of air directed toward the fan.

One of the undesirable characteristics of fans is a stall or flow-breakaway condition, which usually results from too small an axial velocity relative to the optimum value for which the fan was designed. This condition can be eliminated if the velocity through the fan could be maintained high even though the quantity of air passing the fan is reduced. To provide these conditions a variable area of exposed fan blades becomes desirable. It is therefore a further object of this invention to vary the effectiveness of the fan and avoid the stall condition by varying the working area of the fan.

Further objects and advantages of this invention will become apparent in the following detailed description thereof.

In the accompanying drawings:

Figure 1 is an elevation, largely diagrammatic, and with part of the engine cowl broken away, showing one form of this invention as applied to a tractor type airplane;

Fig. 2 is a view similar to Fig. 1 showing another form of this invention applied to a pusher type airplane; and Figs. 3, 4 and 5 are views similar to Fig. 2 showing still other forms of this invention.

Referring to Fig. 1, there is disclosed a tractor type of airplane in which a propeller 10 and a spinner 11 are rotated by an engine 12 enclosed within a cowl 15 at the forward end of the fuselage or engine nacelle 16. The cowl is open at its forward end 17 so that the travel of the airplane will cause air to enter the cowl, pass over and cool the engine, and discharge through a rear passage 19 between the cowl and the main fuselage. The amount of cooling air passing through the cowl and over the engine due to the movement of the airplane would be insufficient under most operating conditions, and therefore a fan 25 is provided, said fan being driven from the engine and adapted to force the air through the cowl. More air can thus be passed through the cowl than would be the case if the movement of the airplane alone were relied upon to force the air into opening 17.

As stated in the introduction hereto, it is not always desired that the full effect of the fan shall be exerted under all operating conditions. Thus, for example, at lower altitudes less output from the fan is desired than at higher altitudes. Therefore this invention provides means for varying the effectiveness of the fan. Such variation may be controlled by an operator or it may be automatically controlled in accordance with variations of some factor such as altitude or engine temperature. For this purpose there is provided in combination with the fan, means for controlling the amount of air delivered to the fan and for controlling the effective area of the fan.

In Fig. 1 there is shown one such means in the form of a plurality of flaps 30 pivoted at their forward ends on the cowl at 31 adjacent the opening 17 and having their rearward ends terminating adjacent the fan 25. By causing the rearward ends of said flaps to converge, the opening for the entering air is reduced so that a lesser quantity of air enters the cowl, and, further, part of the fan is cut off from effective contact with the entering air. Thus simultaneously there is effected a two-way control of the cooling air passing through the cowl—the amount of air entering the cowl is controlled and the effective area of the fan acting upon this quantity of air is also controlled at the same time and by the same means.

This invention is capable of embodiment in various forms and to various types of airplanes. Thus, in Figs. 2 to 5 certain forms of this invention are shown applied to pusher type aircraft but it will be understood that the principles involved apply equally well to tractor types of airplanes. In Fig. 2, the propeller 10 is shown at the rear of the craft, driven by the engine 12 enclosed in cowl 15', through a shaft and gear reduction unit 44. In this form, the flaps 40 are pivoted at their forward ends at 41 on the engine casing, the rearward ends of the flaps operating adjacent the fan 26'. The action is the same as in the Fig. 1 form of the invention.

In the Fig. 4 form, there are provided in addition to the flaps 40 of the Fig. 2 form, flaps 42 at the rear of the fan, the latter flaps being pivoted at their rearward edges upon the gear casing 43 enclosing the gearing 44 and supporting the spinner 11'. In this form the effective area of the fan may be controlled at the entering and leaving sides of the fan, and the positioning of the flaps 40 and 42 will determine the quantity of air handled by the fan.

The Fig. 5 form is similar to the Fig. 4 form, but the two sets of flaps 40' and 42', instead of being supported on the engine casing, are both supported on the cowl 15'. The action is the same as in the Fig. 4 form except that the flaps operate in directions opposite to that of flaps 40 and 42.

In Fig. 3 there is disclosed a form of this invention which does not employ flaps but instead employs an inflatable member for varying the amount of air delivered to the fan and for varying the effective area of the fan. Said member may take the form of a flexible annular tube 50 adapted to surround the engine casing in advance of the fan 25', with the axis of the tube coincident with the axis of rotation of the fan. Suitable connection to a source of fluid pressure may be made so that by inflating tube 50 it will reduce the annular passage between it and the cowl 15' and at the same time cover up more of the fan so as to reduce the effective fan area. Its action is therefore similar to that of flaps 30, 40 or 40'. If desired, another inflatable member 52 may be provided at the rear of the fan, the member 52 being supported on the gear casing 43.

In accordance with the provisions of the patent statutes, I have herein described the principle and operation of my invention, together with one embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a device of the character described, a fan having an annular pumping region with outer and inner limits, means providing an annular opening for a stream of cooling air to reach said fan, and adjustable means comprising flaps pivoted at their forward ends and terminating adjacent said fan at the rearward ends of said flaps, said flaps being adapted to cut off a predetermined annular portion of said region.

2. In a device of the character described, a fan having an annular pumping region with outer and inner limits, means providing an annular opening for a stream of cooling air to reach said fan, and adjustable means comprising flaps pivoted at their forward ends and terminating adjacent said fan at the rearward ends of said flaps, said flaps being adapted to cut off the outer portion of said region.

3. In a device of the character described, a fan having an annular pumping region with outer and inner limits, means providing an annular opening for a stream of cooling air to reach said fan, and adjustable means comprising flaps pivoted at their forward ends and terminating adjacent said fan at the rearward ends of said flaps, said flaps being adapted to cut off the inner portion of said region.

JOHN G. LEE.

REFERENCES CITED

The following references are of record in the file of this patent:

UNITED STATES PATENTS

| Number | Name | Date |
| --- | --- | --- |
| Re. 19,800 | McPherson | Dec. 31, 1935 |
| 1,181,873 | Gue et al. | May 2, 1916 |
| 1,834,959 | May | Dec. 8, 1931 |
| 1,846,379 | Anderson | Feb. 23, 1932 |
| 1,858,071 | Chester | May 10, 1932 |
| 1,962,685 | Green | June 12, 1934 |
| 2,160,281 | Price | May 30, 1939 |
| 2,182,054 | Richard | Dec. 5, 1939 |
| 2,226,539 | Wydler | Dec. 31, 1940 |
| 2,268,183 | Bugatti | Dec. 30, 1941 |
| 2,347,153 | Hagen et al. | Apr. 18, 1944 |
| 2,350,784 | Lohner et al. | June 6, 1944 |
| 2,396,598 | Neumann et al. | Mar. 12, 1946 |